US008714593B2

(12) United States Patent
Bonanno (10) Patent No.: US 8,714,593 B2
(45) Date of Patent: May 6, 2014

(54) HUMAN POWERED VEHICLE WITH UNPOWERED WHEELS

(76) Inventor: Robert Bonanno, Newark, NJ (US)

( * ) Notice: Subject to any disclaimer, the term of this patent is extended or adjusted under 35 U.S.C. 154(b) by 0 days.

(21) Appl. No.: 13/591,806

(22) Filed: Aug. 22, 2012

(65) Prior Publication Data

US 2013/0214520 A1    Aug. 22, 2013

Related U.S. Application Data

(60) Provisional application No. 61/526,758, filed on Aug. 24, 2011.

(51) Int. Cl.
*B62K 5/08* (2006.01)
(52) U.S. Cl.
CPC ...................................... *B62K 5/08* (2013.01)
USPC ......................................................... 280/771
(58) Field of Classification Search
CPC .......... B62K 5/08; B62K 5/00; B62B 17/066; A47D 13/04
USPC .......... 280/771, 263, 281.1, 282, 87.041, 209
See application file for complete search history.

(56) References Cited

U.S. PATENT DOCUMENTS 3,532,356 A * 10/1970 Lillibridge ................ 280/87.051
3,621,819 A * 11/1971 Hooper ........................ 119/727
4,463,817 A * 8/1984 Mennesson ................ 180/65.51
4,843,665 A    7/1989 Cockel et al.
5,219,369 A    6/1993 Gastle et al.
5,501,210 A    3/1996 Van Hoogmoed
5,713,590 A    2/1998 Clark
6,684,424 B2   2/2004 Jehn
8,038,158 B1 * 10/2011 White ........................... 280/32.5
2006/0006628 A1    1/2006 Fields
2010/0133767 A1 * 6/2010 Arney ........................ 280/28.15

FOREIGN PATENT DOCUMENTS

EP      0 776 648 A1    6/1997
WO      WO 97/18786 A1  5/1997
WO      WO 02/45642 A3  6/2002

OTHER PUBLICATIONS

Sorrel, Charlie; Street Flyer: A Hang-Glider for the Ground; Feb. 3, 2011; Wired.com; Feb. 2011; http://www.wired.com/gadgetlab/2011/02/street-flyer-a-hang-glider-for-the-ground/.*
www.streetflyer.info/; Carsten Mehring.

* cited by examiner

Primary Examiner — J. Allen Shriver, II
Assistant Examiner — Brian Cassidy
(74) Attorney, Agent, or Firm — Gerhart Law, LLC (57) ABSTRACT

A human powered vehicle with four unpowered wheels. Front and rear wheel bearing sections are joined by a top frame structure. A swing suspended from the frame structure supports a driving rider in either a prone or a sitting position. In the prone position, the rider is oriented, heard first, along the axis of travel, and positioned beneath the frame structure. The vehicle has a steering mechanism and a braking system, both situated to be operative by the rider when the rider is positioned to be in any of a standing, sitting or prone position.

11 Claims, 7 Drawing Sheets

HUMAN POWERED VEHICLE WITH UNPOWERED WHEELS

CLAIM OF PRIORITY

This application claims the priority of U.S. Ser. No. 61/526,758 filed on Aug. 24, 2011, the contents of which are fully incorporated herein by reference.

FIELD OF THE INVENTION

The invention relates to human powered vehicles, and more particularly, to multi-passenger, human-powered, hand-steered, four-wheel vehicles in which the motive power is not transmitted through the wheels.

BACKGROUND OF THE INVENTION

Riding downhill on human/gravity powered vehicles, such as a mountain bike, can be an exhilarating, but dangerous experience, requiring significant cycle handling expertise and good balance skills.

The human/gravity powered vehicle of this invention is designed to provide the same exhilaration but in a safer manner. In particular, the human/gravity powered vehicle of this invention does not require such handling expertise or that the rider balance the vehicle. The four wheeled vehicle of this invention is designed to allow one or more riders descend a hill under the power of gravity while standing in a natural upright position. The vehicle may be equipped with brakes and a steering assembly to allow the rider to always be in full control. The design of the present invention is also flexible enough to allow the driver and/or passengers of the vehicle to also position themselves in a seated or in a prone position, or some combination thereof.

In particular, the present invention allows a user to simulate the experience of flying, unlike other vehicles. The user positions himself in the prone position in the vehicle. The vehicle is then propelled using gravity or human power (such as people holding onto the vehicle and walking or running) to propel the vehicle. This type of vehicle with its flying simulator is unique and inventive. Other vehicles exist that provide speed and/or multiple wheels with steering and brakes, but none provides for a user to lie prone in an open-air vehicle that can travel at a rate of speed conducive to providing the feeling of flying. This simulates flying because the person is in the prone position often depicted for personal flying, and the open-air design of the vehicle allows the user to feel the wind blowing against and flowing past his face and body.

DESCRIPTION OF THE RELATED ART

The relevant prior art involving unpowered vehicles includes:

U.S. Pat. No. 5,713,590 issued to Clark on Feb. 3, 1998 entitled "Hand propelled velocipede, quadricycle" that describes a vehicle having two steerable front wheels and two rear wheels that are driven by fore and aft motion of a handlebar atop a pivoted column assembly. Rotation of the handlebar steers the front wheels through a closed loop pre-tensioned push pull wire cable. The steering and propulsion actions are independent of one another. The column assembly translatory motion is converted to rotary motion of a sprocket by a crank mechanism. The sprocket drives a chain and derailleur mechanism connected to the rear axle through an overrunning clutch for coasting forward free of the column assembly. An adjustable friction drag interposed between the rear axle and the chain drive provides enough yieldable connection between the column assembly and the rear wheels to overcome problems associated with dead center of the crank mechanism.

U.S. Pat. No. 4,843,665 issued to Cockel, et al. on Jul. 4, 1989 entitled "Patient transport and bed comfort aid" that describes a patient comfort and convenience device for use in conjunction with a hospital bed having a mattress disposed between a spaced headboard and footboard and a mechanized drive for raising and lowering the mattress. There is a first support structure disposed between the footboard and the mattress, the first support structure including a pair of spaced vertical first members disposed at respective ones of a pair of foot corners of the mattress. There is also a second support structure disposed between the headboard and the mattress, the second support structure including a pair of spaced vertical second members disposed at respective ones of a pair of head corners of the mattress. A pair of rigid side rails are disposed between respective ones of the first and second members along and above upper side edges of the mattress. A fabric sling is disposed between the side rails. Preferably, the side rails are releasably attached to the tops of the vertical members and there are addition supporting devices on wheels configured as, for example, a gurney cart, an ambulance stretcher, and a wheelchair to allow the patient to be maintained in the device from pickup to hospital room. The side rails each include opposed, lockable, pivoting joints therein whereby the side rails can be bent into a chair shape or permit the patient to sit up. There is a controller for controlling the mattress and the sling in combination through steps allowing patient turning, etc. The sling is made of a porous, non-absorbent plastic material and there is a drain pan for placement on the mattress under the sling to catch water passing through the sling so the patient can be bathed. The sling also has a closable centrally located hole positioned under the genital area of a patient in the sling.

U.S. Pat. No. 6,684,424 issued to Jehn on Feb. 3, 2004 entitled "Veterinary gurney" that describes a mobile veterinary gurney having a base frame member supporting a plurality of wheels, an elevation scissor frame member mounted on the base frame, and a gurney table mounted on the elevation scissor frame, there being mounted on the elevation scissor frame member a manually actuated, pressurized gas cylinder cooperative with the base frame member for controlling the opening and closing of the elevation scissor frame member and allowing the elevation of the gurney table to be locked at a selected height.

Various implements are known in the art, but fail to address all of the problems solved by the invention described herein. One embodiment of this invention is illustrated in the accompanying drawings and will be described in more detail herein below.

SUMMARY OF THE INVENTION

The present invention relates to a human powered vehicle that, in a preferred embodiment, may have four unpowered wheels.

In a preferred embodiment, the human powered vehicle with unpowered wheels may have a top frame structure that may join a front section to a rear section. Each of the front and the rear sections may have two wheels that may be oriented substantially parallel to each other.

The four, unpowered wheels may be positioned to support the human powered vehicle, and to provide the vehicle with an axis of travel in a direction from said rear section towards the front section.

In a preferred embodiment, a swing support may be suspended from the top frame structure. The swing support may be configured to support a driving rider in either a prone or a sitting position. In the prone position, the driving rider may be oriented, heard first, along the axis of travel, and may also be positioned beneath the top frame structure.

The present invention preferably has both a steering mechanism and a braking system. Both the steering mechanism and the braking system may be situated to be operative by the driving rider when they are positioned in either the standing, sitting or prone position.

In a preferred embodiment, the steering mechanism may be used by the driving rider to alterably control an angle of the front section's two wheels with respect to the axis of travel.

Therefore, the present invention succeeds in conferring the following, and others not mentioned, desirable and useful benefits and objectives.

It is an object of the present invention to provide a human powered vehicle that allows a user to ride downhill in a comfortable, natural, standing position.

It is another object of the present invention to provide a human powered vehicle that allows a user to ride downhill without having to balance the vehicle.

Yet another object of the present invention is to provide a human powered vehicle that allows the user to be in control by means of steering or braking the vehicle.

Still another object of the present invention is to provide a human powered vehicle that optionally allows a user to ride downhill in a sitting or a prone position.

Still another object of the present invention is to provide a human powered vehicle that may be used for rehabilitation, therapy or travel.

Yet another object of the present invention is to provide a human powered vehicle that is a thrill to ride downhill.

Another object of the invention is to provide the user with an experience similar to flying without the confines of other flying machines.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
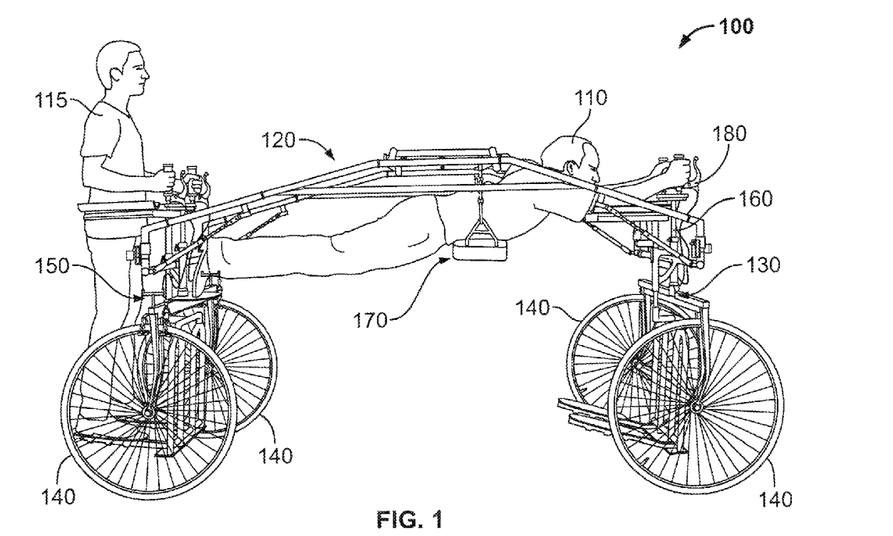
FIG. 1 shows a perspective view of an embodiment of the invention in which the driving rider is in a prone position and the non-driving rider is in a standing position at the rear of the human powered vehicle.

FIG. 1 shows a perspective view of an embodiment of the invention in which the driving rider 110 is in a prone position and the non-driving rider 115 is in a standing position at the rear of the human powered vehicle 100. In this use, when the invention is propelled, either by gravity or another person pushing or pulling it, the user in the prone position may feel like he's flying through the air due to the open nature of the invention and his position in it. Although either user can control the braking, the user standing in back of the vehicle may act as an added safeguard, since he can easily dismount the vehicle and help slow it down if necessary, or dismount to repair any piece that may malfunction during use.

As shown in FIG. 1, in a preferred embodiment, the human powered vehicle 100 may consist of a top frame structure 120 that may be connected at a forward end to a front section 130. The top frame structure 120 may also be connected at a rear end to a rear section 150.

The front section 130 may include two wheels 140 that may be oriented substantially parallel to each other. The front section 130 may also include a steering mechanism 160 and a braking system 180. Both the steering mechanism 160 and the braking system 180 are preferably situated so as to be operative by the driving rider 110 in all positions, including the prone position. The steering mechanism 160 may be used by the driving rider 110 to alterably control an angle of the front section's two wheels with respect to a direction, or axis, of travel of the human powered vehicle 100.

The rear section 150 may also include two wheels 140 that may be oriented substantially parallel to each other.

A swing support 170 may be suspended from the top frame structure 120. The swing support 170 may be configured to support a driving rider 110 in a prone position, oriented head-first along the axis of travel and beneath the top frame structure 120.

Figure 2:
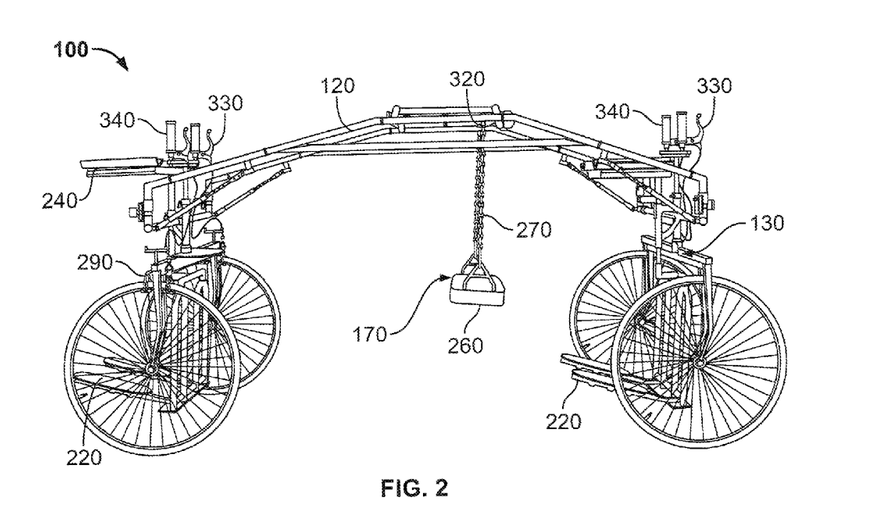
FIG. 2 shows a side view of a preferred embodiment of the invention.

FIG. 2 shows a side view of a preferred embodiment of the human powered vehicle 100 with unpowered wheels of the present invention.

As detailed about the human powered vehicle 100 may consist of three parts connected together: the top frame structure 120 connected to a front section 130 and to a rear section 150.

The top frame structure 120 is preferably a lightweight but strong structure. In a preferred embodiment, the top frame structure 120 is a framework made of joined tubular elements. The tubular elements may, for instance, be any suitable structural tubing made of a material such as, but not limited to aluminum and aluminum alloys, copper and copper alloys, stainless steels and titanium, or some combination thereof.

The swing support 170 may be suspended from one or more attachment points 320 that may be a part of the top frame structure 120. The swing support 170 may include a substantially solid base 260 that is suspended by a flexible tension module 270 from the attachment point 320.

The substantially solid base 260 may, for instance, be made from a suitably rigid, strong material such as, but not limited to, a plastic, including polyethylene, high-density polyethylene, polypropylene (PP), high impact polystyrene (HIPS) and polycarbonate (PC), a wood, including oak, pine, ash, beech, elm, maple, teak or walnut, a wood-plastic composite or some combination thereof.

The flexible tension module 270 may, for instance, be a suitable material such as, but not limited to, rope, metal or plastic cable, metal or plastic chain, or some combination thereof.

The swing support 170 may be configured to be adjustable, both along the length of at least a portion of the top frame structure 120 and in height. This adjustability may allow the swing support 170 to be configured to support a driving rider 110 in both a prone position, and in a sitting position.

As shown in FIG. 2, the rear section 150 may also include one or more footpads 220 as well as at least one brake 290, at least one armrest 240, a handle bar handle 340 and a brake lever 330.

The footpad 220 on the rear section 150 may be used by a non-driving rider 115 to stand at the rear. The armrests 240 may be where the non-driving rider 115 rests his arms. The armrests 240 are adjustable in a vertical direction to allow the non-driving rider 115 to configure them so that non-driving rider 115 is in easy reach of both the brake lever 330 and the handle bar handle 340. The brake lever 330 may be part of the braking system 180 and may be used to engage the brake 290 with the wheels 140 of the rear section 150, so as to slow or stop the human powered vehicle 100. Alternately or in conjunction with the rear brakes, there may be front brakes as well, either controlled by the same controller as for the rear brakes or controlled separately.

The front section 130 may also include at least one footpad 220, as well as at least one brake lever 330 and at least one handle bar handle 340.

In a preferred embodiment, the brake lever 330 on the front section 130 may be used to activate the brake 290 on the rear section 150.

Figure 3:
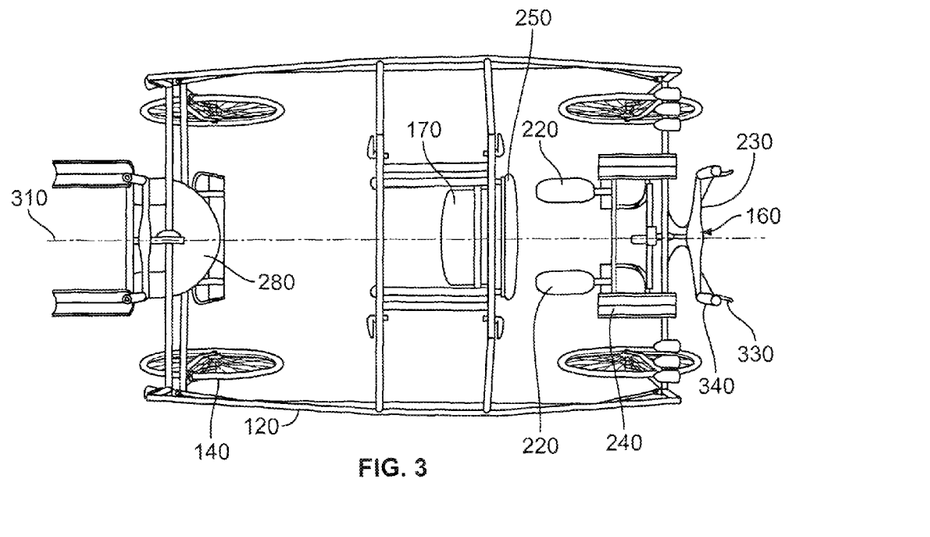
FIG. 3 shows a top view of a preferred embodiment of the invention.

FIG. 3 shows a top view of a preferred embodiment of the human powered vehicle 100 with unpowered wheels of this invention.

FIG. 3 shows how the four wheels 140 may be positioned substantially under the corners of the top frame structure 120, thereby providing stability to the human powered vehicle 100. The substantially parallel alignment of the four wheels 140 also provides an axis of travel 310 that runs in a direction from the rear section 150 to the front section 130.

FIG. 3 also shows how the front section 130 may include a steering mechanism 160. The steering mechanism 160 may include a handle bar 230 that may have one or more handle bar handles 340. In a preferred embodiment, the steering mechanism 160 may be configured to control the orientation of the two wheels 140 located in proximity to the front end of the axis of travel 310. The steering mechanism 160 may also be configured to be operable by the driving rider 110 whichever position they elect to travel in: standing, sitting or lying prone.

The front section 130 may also have one or more footpads 220 and one or more armrests 240. The footpads 220 may provide a base for the driving rider 110 to stand on when electing to travel in a standing position. The footpad 220 may also provide a rest for the feet when the driving rider 110 elects to travel in a seated position, seated on the swing support 170. The armrests 240 may be adjustable in a vertical direction to allow the driving rider 110 to position them so that the handle bar handles 340 and the brake lever 330 are both within easy grasp whichever position the driving rider 110 elects to ride: standing, sitting or lying prone.

FIG. 3 also shows how the rear section 150 of the human powered vehicle 100 may include a rear footrest 280. The rear footrest 280 may be used by the driving rider 110 when electing to travel in a prone mode.

FIG. 3 also shows how the top frame structure 120 may include a combination head or back rest 250. When the driving rider 110 elects to travel in a standing mode, the combination head or back rest 250 may serve as a back rest. When the driving rider 110 elects to travel in a sitting mode, the combination head or back rest 250 may serve as a head rest.

Figure 4:
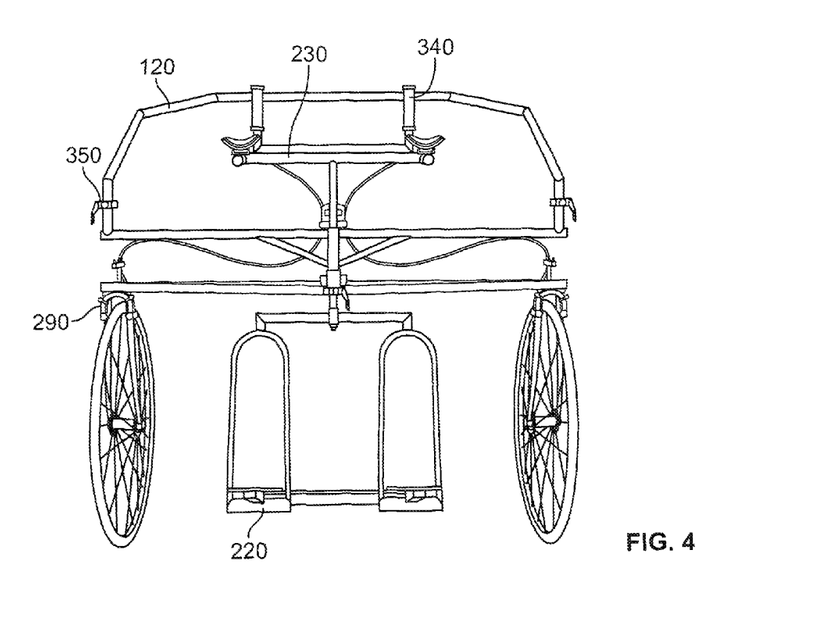
FIG. 4 shows a rear view of a preferred embodiment of the invention.

FIG. 4 shows a rear view of a preferred embodiment of the human powered vehicle 100 with unpowered wheels of the present invention.

In a preferred embodiment, the rear section handle bar 230 may include at least one handle bar handle 340 that may provide the non-driving rider 115 with a secure hold. The handle bar 230 may also have a brake lever 330 (hidden behind the handle bar handle in this view) that may be used by the non-driving rider 115 to activate one or more brakes 290 that may serve to slow or stop the rear wheels 140, thereby slowing or stopping the human powered vehicle 100.

Also shown in FIG. 4 are one or more optional rear reflector 350 that may be attached to the rear end of the top frame structure 120, and one or more footpads 220 that may be a part of, or suspended from, the rear section 150. The rear reflector 350 may, for instance, be a retro-reflector or it may be a battery operated light.

Figure 5:
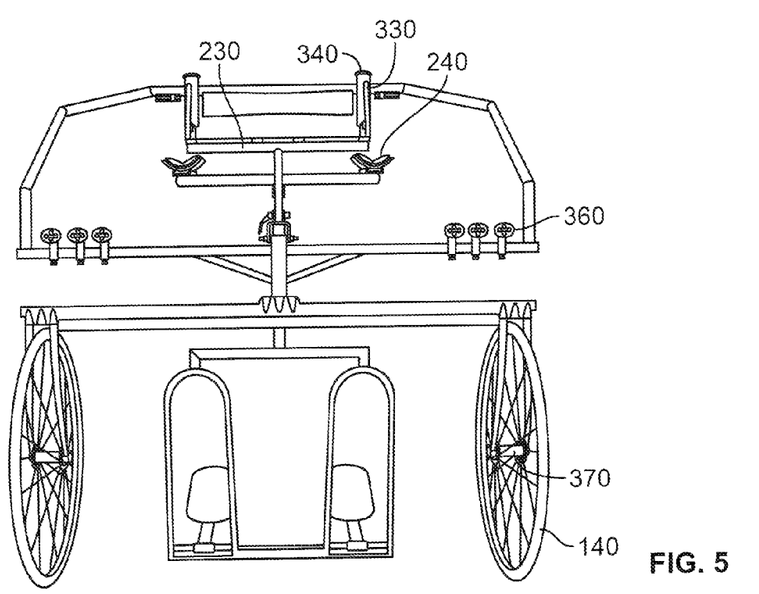
FIG. 5 shows a front view of a preferred embodiment of the invention.

FIG. 5 shows a front view of a preferred embodiment of the human powered vehicle 100 with unpowered wheels of the present invention.

In a preferred embodiment, the front handle bar 230 may include one or more handle bar handles 340 that may further incorporate one or more brake levers 330. The front brake levers 330 may, however, activate the brake 290 that acts on the rear wheels 140. The armrest 240 may be adjustable to facilitate the driving rider 110 having the brake lever 330 in easy reach.

FIG. 5 also shows how the top frame structure 120 may have one or more front lights 360 attached in a vicinity of the front of the top frame structure 120. The front light 360 may, for instance, be a battery operated light such as, but not limited to, a light emitting diode (LED), a halogen light, a tungsten filament light, or some combination thereof.

FIG. 5 also shows how the wheels 140 may be connected to the front section 130 by means of an axial rotational bearing 370. The axial rotational bearing 370 may, for instance, be a bearing such as, but not limited to, a plain bearing, a bushing, a journal bearing, a rolling-element bearing that may have ball, cylindrical or tapered rollers, a fluid bearing or a magnetic bearing, or some combination thereof. The axial rotational bearing 370 may also be a fixed hub bearing or a free-wheel hub bearing.

Figure 6A:
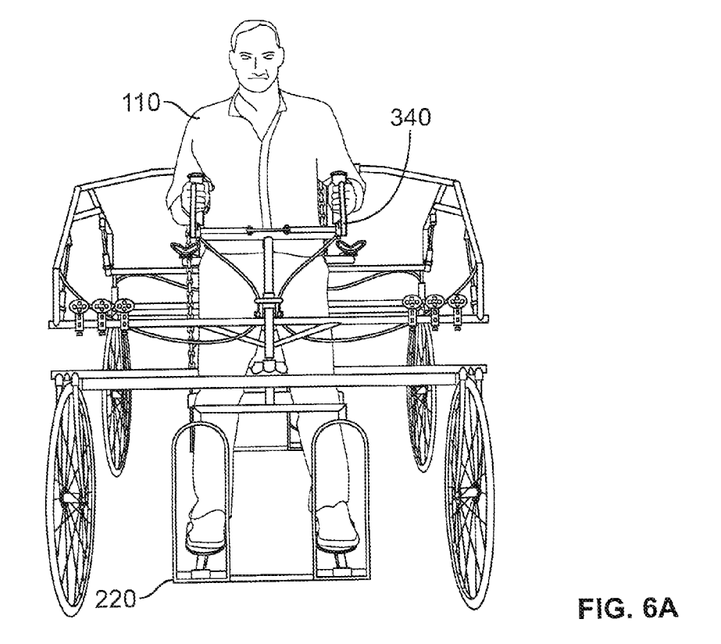
FIG. 6A shows a front view of a preferred embodiment of the invention with a single occupant, the driving rider, in a standing position.

FIG. 6A shows a front view of a preferred embodiment of the human powered vehicle 100 of the present invention with a single occupant, the driving rider 110, in a standing position.

The driving rider 110 has his feet on the front footpads 220 and is holding the front handle bar handles 340 with his hands.

Figure 6B:
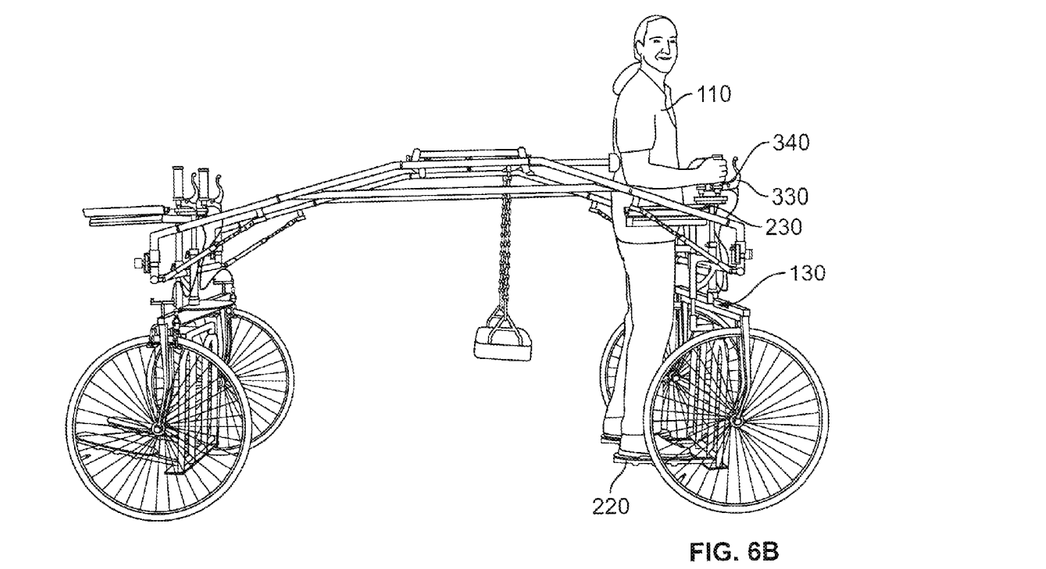
FIG. 6B shows a side view of a preferred embodiment of the invention with a single occupant, the driving rider, in a standing position.

FIG. 6B shows a side view of a preferred embodiment of the human powered vehicle 100 of the present invention with a single occupant, the driving rider 110, in a standing position.

As in FIG. 6A, the driving rider 110 in FIG. 6B has his feet on the front footpads 220 and is holding the front handle bar handles 340 with his hands. The driving rider's 110 hands may then be positioned to easily activate the human powered vehicle's braking system 180 by operating one or more of the front brake levers 330. The driving rider 110 may also use the handle bar handle 340 to turn the front handle bar 230 that may steer the human powered vehicle 100. In an alternate embodiment, steering may be accomplished by turning the entire front section 130.

Figure 7A:
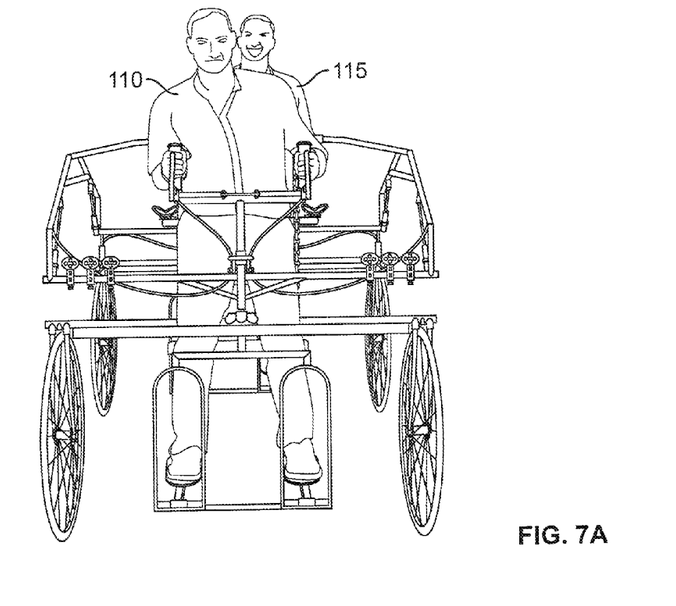
FIG. 7A shows a front view of a preferred embodiment of the invention with two occupants, the driving rider and the non-driving rider, both in a standing position.

FIG. 7A shows a front view of a preferred embodiment of the human powered vehicle 100 of the present invention with two occupants, the driving rider 110 and the non-driving rider 115, both in a standing position.

Figure 7B:
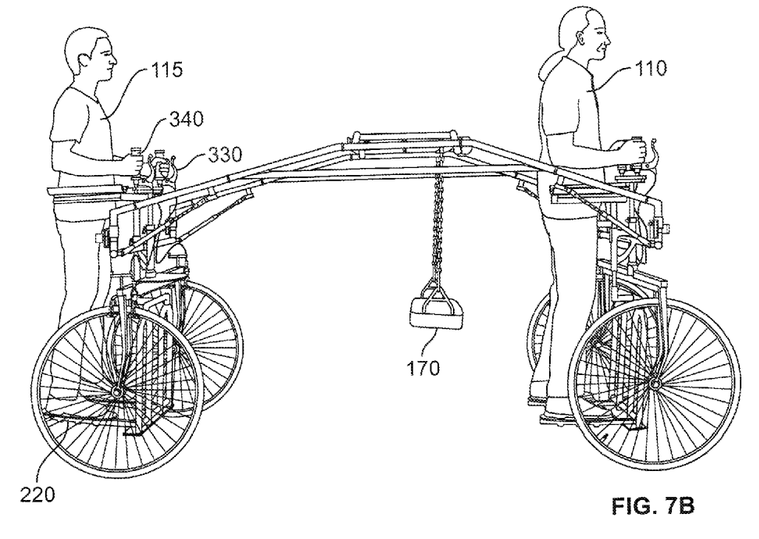
FIG. 7B shows a side view of a preferred embodiment of the invention with two occupants, the driving rider and the non-driving rider, both in a standing position.

FIG. 7B shows a side view of a preferred embodiment of the human powered vehicle 100 of the present invention with two occupants, the driving rider 110 and the non-driving rider 115, both in a standing position. In this mode of use, a third rider may also travel on the human powered vehicle 100 by assuming a seated position on the swing support 170.

FIG. 7B shows the non-driving rider 115 in a standing position with his feet resting on the rear footpads 220 and his hands grasping the rear handle bar handles 340. With his hands grasping the handle bar handle 340, the non-driving rider 115 may easily operate the rear brake lever 330 and thereby activate the braking system 180.

In a preferred embodiment, the rear section 150 may not have steerable wheels 140 so as to avoid the confusion of two people trying to steer the human powered vehicle 100 at the same time.

In a further, preferred embodiment, the rear section 150 may have steering wheels 140 and the front section 130 may have fixed wheels 140.

Figure 8A:
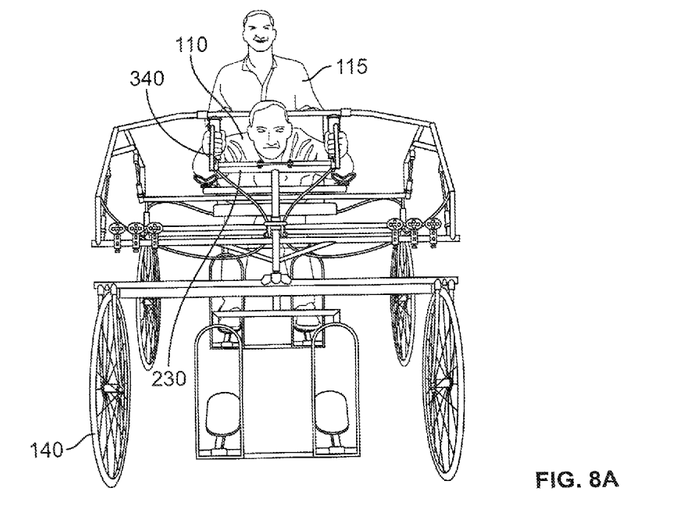
FIG. 8A shows a front view of a preferred embodiment of the invention with two occupants: the driving rider in a prone position and the non-driving rider in a standing position.

FIG. 8A shows a front view of a preferred embodiment of the human powered vehicle 100 of the present invention with two occupants: the driving rider 110 in a prone position and the non-driving rider in a standing position 115.

The driving rider 110 may have his hands grasping one of more handle bar handles 340. The driving rider 110 may then steer the human powered vehicle 100 by turning the handle bar 230 that may then turn the front wheels 140, altering their orientation with respect to the human powered vehicle 100 current direction of travel and thereby altering the direction of travel of the human powered vehicle 100.

Figure 8B:
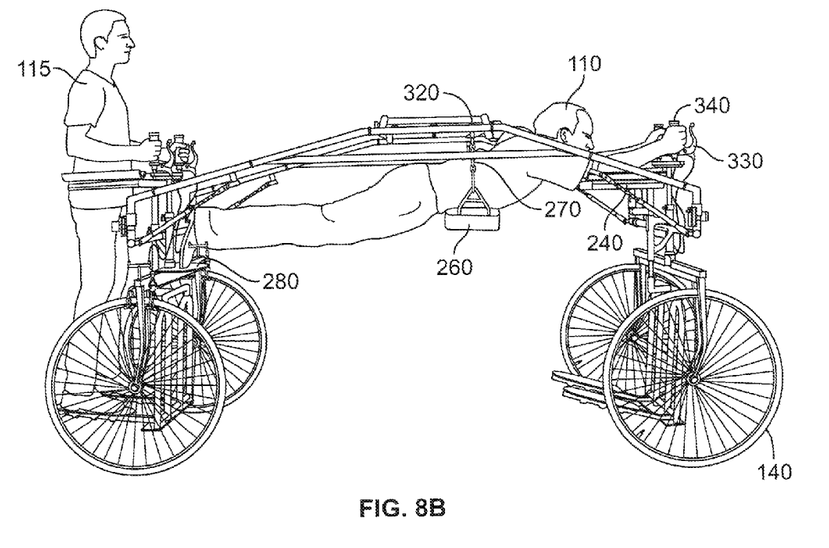
FIG. 8B shows a side view of a preferred embodiment of the invention with two occupants: the driving rider in a prone position and the non-driving rider in a standing position.

FIG. 8B shows a side view of a preferred embodiment of the human powered vehicle 100 of the present invention with two occupants: the driving rider 110 in a prone position and the non-driving rider in a standing position 115.

The driving rider 110 may achieve the prone position by having their mid-body rest on the swing support 170 while their hands may grasp the front handle bar handle 340, while their arms may rest on the front armrests 240. At the same time, their feet may rest on the rear footrest 280. The flexible tension module 270 may be adjusted to be on a forward attachment point 320 so as to be in a suitable horizontal position for supporting the driving rider 110. The flexible tension module 270 may also be adjusted in length so that the substantially solid base 260 of the swing support 170 may be at the right height to support the driving rider 110.

With their hands grasping the front handle bar handle 340 the driving rider 110 may be suitably positioned both to steer the human powered vehicle 100 by turning the front handle bar 230 and to control the speed of the vehicle by using the front brake lever 330 to control the brake 290 on the rear section 150.

In a preferred embodiment, the driving rider 110, when travelling in the prone position is preferably supported above the axles 210 of the four wheels.

Figure 9:
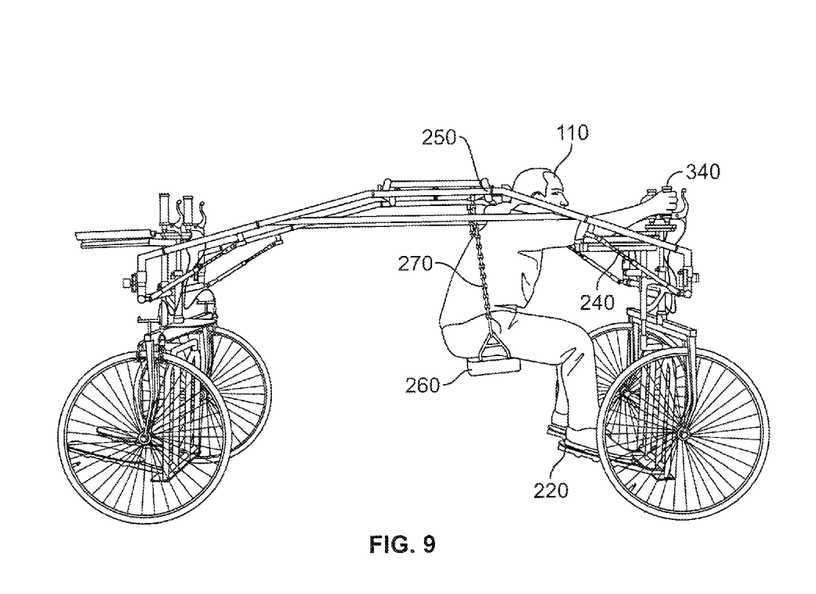
FIG. 9 shows a side view of a preferred embodiment of the invention with a single occupant, the driving rider, in a sitting position.

FIG. 9 shows a side view of a preferred embodiment of the human powered vehicle 100 of the present invention with a single occupant, the driving rider 110, in a sitting position.

The driving rider 110 may assume the sitting position by sitting on the substantially solid base 260 of the swing support 170, while resting their feet on the front footpad 220. The driving rider 110 may then rest their arms on the front armrests 240 and grasp one or more of the front handle bar handles 340 so as to steer and brake the human powered vehicle 100.

The flexible tension module 270 may be adjusted in length in order to have the substantially solid base 260 of the swing support 170 at a suitable height to serve as a seat for the driving rider 110.

As shown in FIG. 9, the driving rider 110 may use the combination head or back rest 250 as a head rest when travelling in a seated position.

Figure 10:
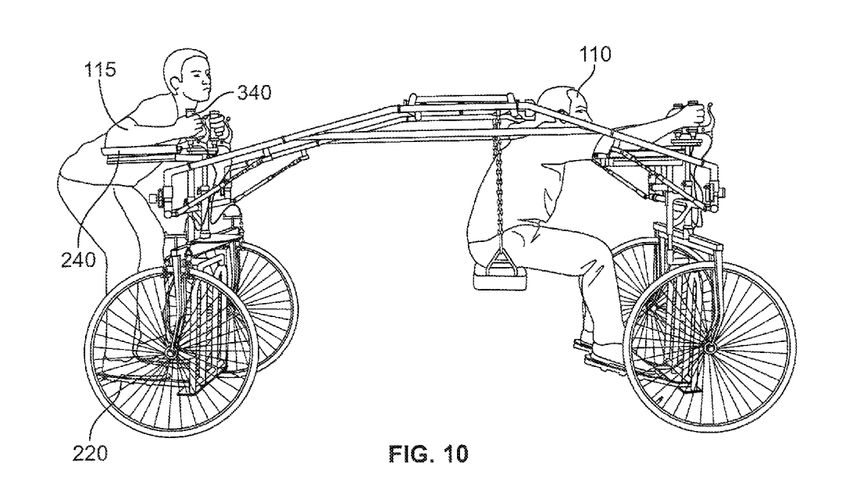
FIG. 10 shows a side view of a preferred embodiment of the invention with two occupants: the driving rider in a sitting position and the non-driving rider in a crouching position.

FIG. 10 shows a side view of a preferred embodiment of the human powered vehicle 100 of the present invention with two occupants: the driving rider 110 in a sitting position and the non-driving rider 115 in a crouching position.

The driving rider 110 may be positioned as in FIG. 9. The non-driving rider 115 may have one or more or their feet resting on the rear footpads 220 while resting their arms on the rear armrests 240 and grasping one or more of the handle bar handles 340.

On substantially level ground, the human powered vehicle 100 with unpowered wheels may be powered and ridden by one or two people propelling the machine by pushing it while walking, jogging or running. The two riders may, for instance, alternate the task of propelling the human powered vehicle 100, taking turns to push while the other rides. In this mode of travel, a third person may also ride in a seated position on the swing support 170.

The human powered vehicle 100 may, for instance, be powered by one or more rollerbladers, or rollerskaters, pushing on various parts of the top frame structure 120, while up to three riders occupy the various possible modes of travelling described above.

When travelling downhill, the human powered vehicle 100 may be powered by gravity while up to three riders occupy the various possible modes of travelling described above.

One of ordinary skill in the art will readily appreciate there are many variations that may be made to the invention described above.

In alternate embodiments of the present invention, possible riding combinations may include, but are not limited to, a front rider, the driver, sitting with rear rider standing; a driver sitting with rear rider standing and a passenger sitting on the swing; a driver standing with a rear rider standing; driver standing with a rear rider standing and a passenger sitting on the swing; a driver prone with a rear rider standing; a rollerblader assuming the position of driver to power, and, or board the vehicle, in any of the position combinations previously mentioned; a rollerblader assuming the position of rear rider to power, and, or, board the vehicle with any combination of passenger/riders previously mentioned; one or more rollerbladers pushing the vehicle with any combination of passenger/riders previously mentioned; and having everyone wears rollerblades, including the driver, the rear rider, and the passenger on the swing.

Having rollerbladers propel the vehicle with any combination of seated, standing, or prone passengers may make the vehicle a very useful transportation mechanism. For instance, one to four rollerbladers may push the vehicle while one to three passengers may ride vehicle. The result may be a quick and relatively effortless mode of transportation.

In addition to gravity flying downhill, the vehicle may be propelled in a number of "green", health-generating ways including, but not limited to, walking, jogging, running, or rollerblading or some combination thereof.

Further embodiments of the vehicle may, for instance, have four seats or more seats for passengers and up to as many rollerbladers, creating a modern day equivalent of a Rickshaw, but one that may be significantly faster and more efficient.

Other embodiments of the invention may include more of fewer wheels; for instance, there may be a center wheel on each side, for a total of six wheels, or there may be two front wheels and one back wheel, for a total of three wheels.

All or any specific part of the invention may be adjustable to allow for differing lengths or widths of the vehicle. For instance, the frame may be adjustable such that the vehicle can be made narrower or wider side to side, and also adjustable to make the vehicle shorter or longer front to back.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A human powered vehicle with unpowered wheels, comprising:
    a top frame structure; a front section, having two front wheels oriented substantially parallel to each other; a rear section having two rear wheels oriented substantially parallel to each other; said top frame structure being attached at a rear end to said rear section and at a front end to said front section such that said four wheels are positioned to support said human powered vehicle and to provide an axis of travel from said rear section towards said front section; a swing support suspended from said top frame structure and configured to support a driving rider in either a prone position, oriented head-first along said axis of travel, beneath said top frame structure, or in a sitting position;
    wherein said front section further comprises a steering mechanism and a braking system, both situated to be operative by said driving rider, and wherein said steering mechanism alterably controls an angle of said front section's two front wheels with respect to said axis of travel and
    wherein said rear section further comprises at least one footpad located to accommodate a non-driving rider in an upright standing orientation.

2. The vehicle of claim 1 wherein said driving rider, when in said prone position, is supported above the axles of said four wheels.

3. The vehicle of claim 1 wherein said steering mechanism is configured to control said two wheels located in proximity to the front end of the axis of travel, and wherein said steering mechanism is further configured to be operable by said driving rider when supported in said prone position.

4. The vehicle of claim 3 wherein said rear section further comprises a second braking system configured to be operated by said non-driving rider when said non-driving rider is located in a standing orientation on the footpad.

5. The vehicle of claim 4 wherein said front section further comprises a handle bar, and at least one armrest, said armrest being adjustably configured to allow said driving rider to rest an arm while holding a handle of said handle bar.

6. The vehicle of claim 5 wherein said rear section further comprises a handle bar, and at least one armrest, said armrest being adjustably configured to allow said non-driving rider to rest an arm while holding a handle of said handle bar.

7. The vehicle of claim 1 wherein said top frame structure comprises a plurality of joined tubular elements.

8. The vehicle of claim 7 wherein said top frame structure further comprises a combination head or back rest, said combination head or back rest being sized and positioned so as to function as a back rest when said driving rider is in a standing position, with at least one foot on said front section footpad, and to function as a head rest when said driving rider is in a seated position, sitting on said swing support.

9. The vehicle of claim 1 wherein said two front wheels are each attached to said front section by a free-wheel hub.

10. The vehicle of claim 1 wherein said swing support comprises a substantially solid base adjustably attached to said top frame structure by at least one flexible tension module.

11. The vehicle of claim 1 wherein said rear section further comprises at least one rear footrest, said rear footrest sized and positioned to provide support for at least one foot and leg of said driving rider when said driving rider is in a prone position.

\* \* \* \* \*

UNITED STATES PATENT AND TRADEMARK OFFICE
CERTIFICATE OF CORRECTION

PATENT NO. : 8,714,593 B2  Page 1 of 1
APPLICATION NO. : 13/591806
DATED : May 6, 2014
INVENTOR(S) : Robert Bonanno It is certified that error appears in the above-identified patent and that said Letters Patent is hereby corrected as shown below:

On the title page, item (74) should read:   Gearhart Law, LLC

Signed and Sealed this
Twelfth Day of August, 2014

Michelle K. Lee
*Deputy Director of the United States Patent and Trademark Office*